C. J. MAULL.
LOCK NUT WASHER.
APPLICATION FILED SEPT. 1, 1920.

1,360,662.

Patented Nov. 30, 1920.

Clinton James Maull INVENTOR.

BY Frank A Chalmers ATTORNEY.

UNITED STATES PATENT OFFICE.

CLINTON JAMES MAULL, OF WILMINGTON, DELAWARE.

LOCK-NUT WASHER.

1,360,662.  Specification of Letters Patent.  Patented Nov. 30, 1920.

Application filed September 1, 1920. Serial No. 407,456.

*To all whom it may concern:*

Be it known that I, CLINTON JAMES MAULL, a citizen of the United States, residing at Wilmington, Delaware, have invented a new and useful Lock-Nut Washer, of which the following is a specification.

It is well known that bolt heads or nuts are frequently locked in position, in a more or less substantial way, by spring tempered split washers, cotter pins and similar devices. These devices however have their defects and limitations.

The object of my improvement therefore is:

To provide a simple and secure locking device for a bolt head or nut by affording facilities in connection with an intervening sheet of metal for preventing the nut from turning on the bolt.

I attain this object by the mechanism illustrated in the accompanying drawing in which—

Figure 1:
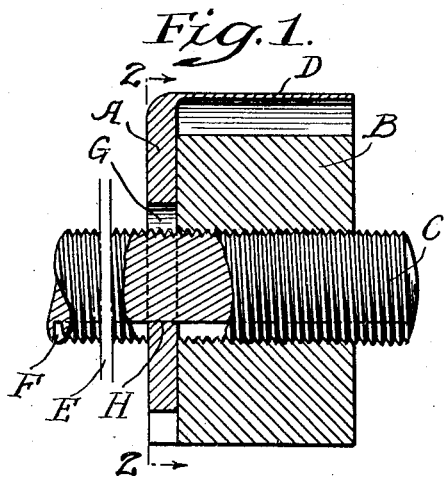
Figure 2:
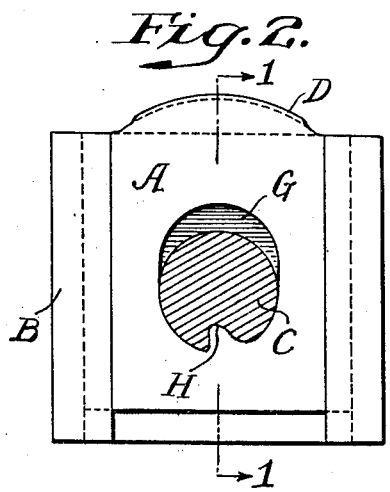

Figure 1— is a sectional view of the nut lock washer bolt and a bearing surface on line 1—1, Fig. 2.

Fig. 2— is an elevation of the device with the bolt shown in section on line 2—2, Fig. 1.

Figure 3:
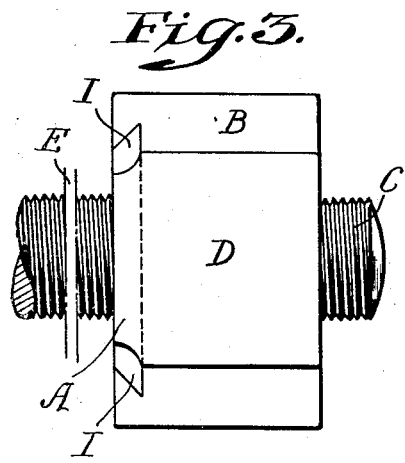

Fig. 3— is a side elevation of the device.

Figure 4:
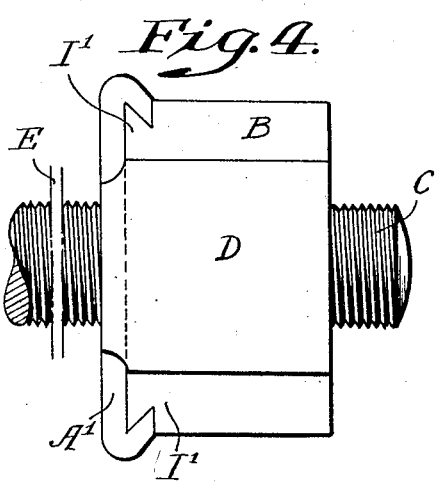

Fig. 4— is a side elevation of the device showing a variation of the manner of attaching the lock washer to the nut or bolt head.

Similar numerals and letters refer to similar parts throughout the several views.

Referring to all of the figures, "A" is the lock washer device. "A'" in the lock washer device shows the engagement in an outside groove. "B" is the nut or bolt head. "C" is the bolt. "D" is the spring portion of A which extends at right angles to the other part of the lock washer and extends across one side of the nut. "E" is the bearing surface against which the nut and lock washer is pressed by the turning up of the nut. "F" is a longitudinal channel in the bolt. "G" is the oblong slot in the lock washer. "H" is the trigger or key in the lock washer which engages in the channel in the bolt. "I" is the internal channel in the nut or bolt head designed to engage on parallel rectangular sides of the lock washer. "I" and "I'" are similar external channels to engage a parallel side of a lock washer designed to fit therein.

I do not restrict myself to a rectangular or triangular longitudinal channel in the bolt as it is clear that a circular or rounded channel would catch the trigger or the lock washer. Nor do I restrict myself to an internal channel along the face of the nut or bolt head as it is apparent that an external channel or other similar device, would answer the same purpose.

The spring "D" is made as a part of and lies at right angles to washer "A" and is disengaged at the two ends of the angular joining and the two end portions of the said spring curved toward the washer "A" and bear against one side of the nut. The spring thus formed and so attached at its center at right angles to washer "A" tends to draw the lock washer "A" toward that side of the nut, thus tending to engage the trigger "H" in the channel "F."

The function of washer "A" is twofold. First to provide an intermediate separating strip of metal between the nut "B" and the bearing surface "E", and secondly, to provide this strip in such form as to cause a tendency on the part of said metal strip "A" to move in such direction as would cause the trigger "H" to engage in the channel "F" when the trigger comes opposite to same and thus prevent the nut from further revolving on the bolt because of the lock washer becoming stationary and because of the said lock washer's engagement with the bolt at the channel bearings "I" and "I'."

Having now particularly described and ascertained the nature of my said invention and the manner of its functioning I declare that what I claim is:—

1. A rectangular metal strip designed to be interposed between a nut or bolt head and a bearing surface provided with means for attaching the said intervening strip to the nut or bolt head, a key or trigger formed in an oblong hole in said intervening strip, and means for compelling the engagement of said key or trigger with the channel longitudinally cut in the bolt, substantially as and for the purposes set forth.

2. An intervening metal rectangular strip or washer provided with two opposite beveled edges designed to engage in beveled recesses cut in a nut or bolt head on the side of the said nut next to the bearing surface, said strip containing an opening oblong in form but with a trigger or key remaining in said strip designed to engage in a longitudinal channel in the bolt, thus preventing the revolution of said washer and consequently by means of the beveled channel engagement of said washer, the nut or bolt head, substantially as and for the purposes set forth.

In witness whereof, I have hereunto signed my name this 28th day of August, A. D. 1920, in the presence of a subscribing witness.

CLINTON JAMES MAULL.

Witness:
A. T. MEADE.